United States Patent [19]

Kuder

[11] Patent Number: 4,636,804

[45] Date of Patent: Jan. 13, 1987

[54] RECORDING MEDIUM COMPRISING A MICROPOROUS POLYMER EXHIBITING ENHANCED SIGNAL TO NOISE RATIO

[75] Inventor: James E. Kuder, Fanwood, N.J.

[73] Assignee: Celanese Corporation, New York, N.Y.

[21] Appl. No.: 690,703

[22] Filed: Jan. 11, 1985

[51] Int. Cl.$^4$ ............................................. G01D 15/14
[52] U.S. Cl. ....................................... 346/1.1; 428/65; 428/315.5; 428/318.4; 346/135.1; 346/137; 430/270; 430/271; 430/945; 369/284; 369/286; 369/288
[58] Field of Search ............. 428/64, 65, 315.5, 318.4; 346/135.1, 1.1, 137; 369/284, 286, 288; 430/270, 271, 945

[56] References Cited

U.S. PATENT DOCUMENTS

| | | | |
|---|---|---|---|
| 4,032,691 | 6/1977 | Kido et al. | 428/318.4 |
| 4,403,231 | 9/1983 | Ando et al. | 346/135.1 |
| 4,461,807 | 7/1984 | Mori et al. | 428/469 |

Primary Examiner—Alexander S. Thomas
Attorney, Agent, or Firm—Burns, Doane, Swecker & Mathis

[57] ABSTRACT

Provided is an archival recording medium and a method for recording information on same. The recording medium comprises a coated microporous polymeric layer and an energy absorbing material, e.g., a layer of an energy-absorbing material such as a metal or dye/polymer layer deposited on the microporous layer. The coating on the microporous film layer is a polymeric coating, which polymer is of sufficient molecular size or branching to preclude entry of the polymer molecules into the pores of the microporous polymer film. If desired, further dimensional stability and mechanical strength can be provided to the recording medium by a thermally stable substrate or by tensioning the medium within a rigid frame.

Information is recorded by the energy-absorbing material heating up in localized irradiated regions and causing the controlled collapse of the microporous structure in the microporous polymer layer. The collapsed portions of the structure constitute the information which can then be read either by reflectance or transmission. Due to the polymeric coating, the recording medium exhibits an enhanced signal to noise ratio upon the reading of the recorded information.

25 Claims, No Drawings

RECORDING MEDIUM COMPRISING A MICROPOROUS POLYMER EXHIBITING ENHANCED SIGNAL TO NOISE RATIO

BACKGROUND OF THE INVENTION

1. Field of the Invention

This invention relates to a novel optical information recording medium and the recording of information thereon. More particularly, the present invention relates to an information recording medium, preferably in the form of a disk, suitable for use with optical recording and playback apparatus, which recording medium comprises as the information layer a microporous polymeric layer coated with a polymeric film. The present invention also relates generally to an optical recording medium used in the form of a tape or as a strip on a card wherein the medium comprises a coated microporous polymeric layer.

2. Description of the Prior Art

Various optical recording media and methods for recording information thereon are known to the prior art. For example, optical recording methods in which light from a laser or some other suitable light source is focused upon the surface of a recording medium with sufficient intensity to cause the formation of pits in the surface material have been proposed. In such methods, an information representative pattern of pits is formed in the surface of the recording medium by suitable control of the intensity of the focused light in accordance with the information to be recorded, while relative motion is established between the recording medium and the focused light spot.

In recent years, attention has been increasingly paid to the information recording method in which information is written in a thin film of metal or the like formed on a substrate by using a laser ray or beam. According to such a method, the recording of information has been accomplished by forming holes or recesses in the metallic thin film under the action of a thermal energy beam such as a laser ray. See, e.g., U.S. Pat. No. 4,238,803.

Spong, U.S. Pat. No. 4,097,895, describes a recording medium which comprises a light reflecting material, such as aluminum or gold, coated with a light absorbing layer, such as fluorescein, which is operative with an argon laser light source. The thickness of the light absorbing layer is chosen so that the structure has minimum reflectivity. An incident light beam then ablates, vaporizes or melts the light absorbing layer, leaving a hole and exposing the light reflecting layer. After recording at the wavelength of the recording light, maximum contrast between the minimum reflectance of the light absorbing layer and the reflectance of the light reflecting layer exists. In this regard, note also U.S. Pat. No. 4,219,826.

Carlson, in U.S. Pat. No. 3,475,760, discloses a system for directly recording information in a thermoplastic film as a deformation by using a high energy laser scanning beam of small diameter.

It has also recently been proposed to employ in an optical disk a thermodegradable layer upon which is deposited a metallic layer which is absorbent at the wavelength of the inscription radiation. See, for example, U.S. Pat. No. 4,380,016. Upon irradiation, the deposited metallic layer heats up, with the heat being diffused towards the thermodegradable layer. The thermodegradable layer is thereby heated to its degradation temperature and the areas thereof in contact with the heated metal zones are destroyed to provide an information bit.

In U.S. Pat. No. 4,032,691, there is disclosed an optical disk comprised of a recording layer of a metal, dye and/or synthetic resin, and a thermally insulating base layer. To increase the sensitivity of the recording material, the patent proposes to use a porous layer between the support and the recording layer.

The use of bubbles, or vesicular materials, in optical disks has also been suggested. For example, in an article by R. P. Freese et al entitled "Characteristics of Bubble-Forming Optical Direct-Read-After-Write (DRAW) Media", *SPIE*, Vol. 329 Optical Disk Technology (1982), there is described a trilayer thin film construction useful in optical disks. The top layer consists of a thin, tough film of a refractory material. The middle layer is an optical spacer of either organic or inorganic material. The bottom layer is a reflective metallic film, such as Cr, Al, Ti or Cu. When the media is exposed to a well focused laser beam, a protuberance or bubble is formed. This formation of the surface protuberance destroys the anti-reflectance condition of the trilayer stack, thus enabling a high reflectance contrast readout of the information.

In "Textured Surfaces: Optical Storage and Other Applications", by Craighead et al, *J. Vac. Sci. Technol.*, Vol. 20 (3), March 1982, there is also disclosed the use of textured surfaces and the selective melting thereof to form smooth reflective regions which can be read as recorded information.

Despite all of the foregoing techniques for the optical recording of information on media such as disks, cards or tapes, the search for a low cost, low energy approach (i.e., more energy efficient approach), particularly as compared to ablative hole burning in metallic layers or dye/polymer layers, is continually on-going. Moreover, there is a need of such an energy efficient system which also provides a high signal to noise ratio. In order to have commercial acceptability, a high signal to noise ratio in read-out of the information is very important.

Accordingly, it is a major objective of the present invention to provide a novel optical recording medium which is stable and on which information can be readily and effectively recorded with a low expenditure of energy, and read with an enhanced signal to noise ratio.

It is yet another object of the present invention to provide a novel recording medium upon which information is recorded as a transparent region.

It is still another object of the present invention to provide a recording medium which comprises a microporous polymeric layer whose structure will selectively and controllably be collapsed to provide a recordation of information.

It is still another object of the present invention to provide a recording disk, card or tape comprising a uniquely suited polymer layer which renders the recording of information technically accurate, economically expedient and energy efficient, with a high signal to noise ratio being exhibited upon reading the information.

Yet another object of the subject invention, in general, is to provide a novel method of recording information by using a microporous polymer layer as an information layer.

These and other objects, as well as the scope, nature and utilization of the invention, will be apparent to those skilled in the art from the following description and the appended claims.

SUMMARY OF THE INVENTION

In accordance with the foregoing objectives, provided herewith is such a novel information recording medium. The recording medium comprises:

(i) an opaque microporous polymer layer coated with a polymeric layer, and (ii) an energy-absorbing material situated with regard to the microporous polymer layer so as to be able to transmit heat thereto.

The microporous polymer layer is comprised of a polymer such as polypropylene or polyethylene having an open-celled structure, preferably with an effective pore size of less than 500 Angstroms. The coating on the microporous polymer layer is a smooth polymeric layer, e.g., a polymer comprised of cellulose acetate, polyester, epoxy, urethane or alkyd units. The preferred resin coating is that of a cellulose acetate polymer. The molecular size of the coating polymer, or at least the branching of the coating polymer, should be sufficient so that the polymer molecules do not enter the pores of the microporous polymer layer.

The energy-absorbing material may be any suitable material, such as a dye, incorporated into the coated microporous polymer layer, or a light absorbing layer deposited thereon. The light absorbing layer deposited on the coated microporous layer may comprise, for example, a metal or dye/polymer layer. When the light absorbing layer is deposited on the microporous layer, it is deposited directly onto the coated face of the microporous polymer layer. Or, in another embodiment, the energy-absorbing material, when comprising a dye/polymer, can fulfill the dual role of the energy-absorbing material and the coating for the microporous polymer layer.

It has been found that upon irradiation of the foregoing system, the energy-absorbing material heats up in the irradiated regions to thereby cause structural collapse in a well-defined (i.e., the heated) area of the microporous polymer layer. Upon collapse of the structure, the result is a transparent area in the polymer layer vis-a-vis the opacity of the remaining polymer layer. The transparent regions thereby define the recorded information.

It is preferred to employ a substrate for the purpose of additional mechanical strength. Any conventional substrate may be employed. Of course, for certain applications it may be desirable for the recording medium to remain flexible. The use of a dye material incorporated into the microporous polymer is a preferred embodiment in such an instance.

DETAILED DESCRIPTION OF THE INVENTION

The present invention provides a recording medium comprising a microporous polymer layer which is coated with a smooth polymeric layer. The use of a microporous polymer is central to the present invention since it is the use thereof which results in the advantages of the present invention. Enhanced signal to noise ratio is acquired through the utilization of the smooth polymeric coating.

The microporous polymer which comprises the information layer of the recording medium is initially opaque due to its porous structure providing so many "nuclei" to cause light scattering. Upon collapse of the structure in a particular area, however, that particular region becomes transparent due to the lack of "nuclei", and denotes an information bit. Moreover, the energy invested in causing this selective collapse of the microporous structure is much less than that required to ablate a polymer or metallic layer in order to cause pit formation. Due to the porosity of the polymer layer, very little polymer need be melted to cause a total collapse of the structure in a well-defined area. As well, due to the stretch tension which generally exists in a film of microporous polymer when a stretching technique is employed in its manufacture, even less heat is required to thereby cause a collapse of the polymer. If the film structure is established by a stretching technique, as the material softens, the inherent strain is released resulting in the material pulling away from the heated spot. This results in also removing reflective or energy-absorbing material from the heated spot. This is the reason that Celgard ® and other microporous films made by a stretch technique are preferred to the use of microporous films manufactured by a non-stretch technique, e.g., leaching. The sensitivity of the layer is simply greater.

It has furthermore been found that such collapse of the porous structure to give a light transparent region provides a significant contrast with the remaining opaque polymer layer so as to be suitable for use in optical disks, as well as other forms of optical recording media such as cards and tape. Thus, a highly sensitive and energy efficient system is achieved through the use of a microporous information layer in accordance with the present invention.

A significant group of polymers, i.e., synthetic resinous materials, from which the microporous polymer utilized in the present invention may be formed are the olefin polymers, e.g., polyethylene, polypropylene, poly-3-methyl butene-1, poly-4-methyl pentene-1, 4-methyl pentene-1, or copolymers thereof with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, relatively long chain alkenes, as well as copolymers of 3-ethyl pentene-1 and any of the same n-alkenes mentioned previously in connection with 3-methyl butene-1.

The invention also contemplates the use of high molecular weight acetal, e.g., oxymethylene polymers. While both acetal homopolymers and copolymers are contemplated, the preferred acetal polymer is a "random" oxymethylene copolymer, i.e., one which contains recurring oxymethylene, i.e., $-CH_2-O-$, units interspersed with $-OR-$ groups in the main polymer chain where R is a divalent radical containing at least two carbon atoms directly linked to each other and positioned in the chain between two valences, with any substituents on said R radical being inert, that is, which do not include interfering functional groups and which will not induce undesirable reactions, and wherein a major amount of the $-OR-$ units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent, or higher.

Further, these polymers have a melting point of at least 150° C. and a number average molecular weight of at least 10,000. For a more detailed discussion of acetal and oxymethylene polymers, see, *Formaldehyde*, Walker, pp. 175-191 (Reinhold, 1964).

Other relatively crystalline polymers to which the invention may be applied are the polyalkylene sulfides such as polymethylene sulfide and polyethylene sulfide, the polyarylene oxides such as polyhexamethylene adipamide (nylon 66) and polycaprolactam (nylon 6), and polyesters such as polyethylene terephthalate, all of which are well known in the art and need not be described further herein for sake of brevity.

The microporous polymers can be prepared in accordance with any of the well-known methods. It is preferred, however, that a microporous film be employed which was prepared by a stretching technique. For example, the microporous polymer layer can be obtained by using the cold stretching, hot stretching and heat setting process of U.S. Pat. No. 3,801,404, the disclosure of which is herein expressly incorporated by reference. Moreover, the process of U.S. Pat. No. 4,138,459 may also be employed, which disclosure is also expressly incorporated herein by reference. The process comprises uniaxially cold stretching a non-porous elastic polymer fiber at a temperature in the range of between about −20° C. and a temperature 25° C. below the crystalline melting temperature of the polymer film. The cold stretching is followed by hot stretching in the sam direction at a temperature e in the range of between about 25° C. below the crystalline melting temperature of the polymer film and 5° C. below the crystalline melting temperature of the polymer film. The last step is a heat relaxing step which comprises exposing the film under tension to a temperature in the range of between about 40° C. below the crystalline melting temperature of the polymer film and 5° C. below the crystalline melting temperature of the polymer film, such that the maximum dimension in the direction of stretch of the cold and hot stretched microporous film is reduced.

The utilization of a microporous film which was prepared by a stretching technique is also preferred in that it has been surprisingly found that when the film is oriented such that the reading laser travels in a direction that is across or perpendicular to the direction of stretching the film, outstanding signal-to-noise ratio is observed. Indeed, the signal-to-noise ratio is far more enhanced than when the film is oriented such that the writing and reading of information is accomplished in the direction of stretching (i.e., with the "machine direction").

Other processes which may be used are disclosed in U.S. Pat. Nos. 3,426,754; 3,558,764; 3,843,761 and 3,920,785, the disclosures of which are hereby expressly incorporated by reference.

The microporous polymer layer is characterized by its open-celled structure. Basically, the passageways of the open-celled structure are measured in their short and long direction. The short dimension, i.e., equivalent to the effective pore size, is preferably less than 500 Angstroms, while the long dimension is preferably less than 5000 Angstroms.

It is also quite important that the polymer be microporous, i.e., an open-celled porous structure, preferably with an effective pore size of less than 500 Angstroms. The micro-size of the pores is an important consideration in terms of obtaining good resolution. Larger pores would simply create voids which are too large for good resolution. Moreover, larger pores would allow less control over the ultimate size of the transparent region, also contributing to poor resolution.

In utilizing the microporous polymer for a recording medium, in a preferred embodiment, a microporous polymer film is tensioned within a rigid frame. *See,* for example, U.S. Pat. No. 4,365,258. Such use is preferred because when the film is stretched, additional stresses, in addition to those previously discussed, are built up in the walls of the microporous structure. When heated, the walls collapse upon relaxation. Therefore, the relative amount of energy needed is less as the energy needed is that only to soften the polymer and not melt or degrade same.

The smooth polymeric coating of the microporous polymer layer utilized in the present invention has been found to result in enhanced signal to noise ratio upon a reading of recorded information. The polymeric coating is preferably of a polymer comprised of cellulose acetate, polyester, epoxy, urethane and/or alkyd units, with cellulose acetate units being preferred. It is important that the molecular size or structure of the polymer comprising the coating be sufficient to preclude entry of the polymer into the pores of the microporous layer. This can be accomplished through length of the polymer chains, or branching or cross-linking of the coating polymer. It is also important that the polymer coating be smooth, otherwise the signal to noise ratio enhancement is diminished.

The polymeric coating of the microporous polymer can be applied using any conventional coating procedure, e.g. knife coating or roll coating. Any solvent used in the coating procedure would, of course, necessarily evaporate completely.

The energy or light absorbing layer which is situated in heat transmission relation to the microporous layer comprises a material which is highly absorbent at the wavelength of the recording radiation, said radiation coming from a laser source or other light source which is able to supply a spot of a sufficiently small size for the inscription of microbits of information. For example, suitable lasers include the diode laser, GaAlAs, which operates at a wavelength in the range of from about 750-850 nm. HeNe lasers operate in the wavelength range of about 633 nm. Argon lasers operate, for example, at about 488 nm. Upon irradiation, the light absorbing material absorbs the energy and heats up to a sufficient temperature to cause a collapse of the porous structure in the microporous layer in those areas in contact with the heated zones of the light absorbing layer. It is preferred that the energy or light absorbing layer be on the side of the microporous layer facing the light source. The best results have been attained thereby. The light absorbing layer can also, however, be on the bottom side of the microporous layer, e.g., the side not facing the light source.

It is preferred that the light absorbing layer comprise either a metal or a dye/polymer combination. If the layer is metallic, it is preferred that the metal be nickel, aluminum, copper, chromium, or palladium/gold. Such a metallic layer can be deposited on the microporous polymer layer by conventional vacuum evaporation, chemical deposition or sputter coating techniques. The use of a metallic layer is preferred due to its panchromatic absorption, as opposed to a dye which generally absorbs in a narrow band width.

If a polymer/dye layer is used, same can be applied by any suitable coating technique, with a conventional technique such as spin coating, which allows for a high degree of control of film thickness and flatness, being preferred. In order to facilitate the coating procedure it is also generally advantageous that the polymer and dye be soluble in the same organic solvent, such as an alcohol or ketone. In this regard, when a dye is used, the polymer and dye should be compatible and mutually co-soluble, but should not dissolve the microporous polymer.

While the dye is added to the polymer in order to insure absorption of the irradiation, the dye, of course, must be absorptive at the appropriate wavelength. If, for example, the writing is to be achieved with a helium-neon laser of 633 nm, then Oil Blue N dye, *Colour Index* 61555, $\lambda_{max}$637 nm, would be a suitable dye for incorporation into the polymer film. If, however, an argon laser is used which provides an output of a wavelength of about 488 nm, an organic dye such as fluorescein, which is highly absorptive at the light frequency of the argon laser, can advantageously be used. Other dyes which may be used include certain nigrosine dyes. The use of a diode laser, generally having output wavelengths in the range of from 750 to 850 nm, would require a suitable dye absorptive in that wavelength region.

In another embodiment, a polymer/dye system can fulfill both roles of smooth polymeric coating and energy-absorbing layer. Of course, the polymer in such an instance must have sufficient molecular size, or have at least sufficient branching, so that the molecules do not enter the pores of the microporous polymer layer. The system as a whole should also preclude the entry of dye molecules into the pores of the microporous polymer layer.

The coated microporous polymer/light absorbing layer system can be employed with a substrate if so desired. Preferably, the system, as well as the substrate, is in the shape of a disk, although other forms, e.g., suitable for use in a tape or card, may also be advantageously used. The substrate is made of a thermally stable material, which is also mechanically rigid and dimensionally stable and which ideally is an isotropic medium and does not warp during storage, writing, erasure or reading.

Depending upon the particular, conventional read mechanism employed, the substrate may be opaque or transparent regarding the read laser beam. The substrate material should be compatible with the polymer employed, with the polymer being capable of adhering well to the substrate either through its own inherent adhesiveness or through the use of a thin layer of an adhesive. Good adhesion, for example, may be defined operationally as the inability to remove the coating from the substrate by means of adhesive tape, e.g., Scotch ® brand tape.

Examples of suitable materials for the substrate include glass and polymethylmethacrylate. Mylar ® is a preferred substrate for use with a tape form, while polyvinyl chloride is a most preferred substrate when the recording medium is utilized in a card.

In an illustrative recording system embodying the principles of the present invention, a record blank of disk form is subject to rotation at a constant linear or constant angular velocity while a beam of light from a light source, e.g., a laser, is focused on the polymer surface of the disk. The intensity of the light beam is controlled in accordance with information to be recorded. Illustratively, the control is effected in accordance with carrier waves modulated in frequency by picture-representative video signals, with the light beam intensity varying as a result between a high level sufficient to cause effective heating of the absorptive material so as to result in a corresponding collapse of the microporous structure, and a low level insufficient to effect such heating/collapse, the frequency of the level alternations varying as the video signal amplitude changes. Preferred writing speeds are in the range of from $10^6$ to $10^7$ bits per second.

The relative diameter of the transparent voids formed in the recording layer will depend not only on the optical and thermal properties of the polymer, but also on the characteristics of the writing beam, i.e., focused spot diameter, depth of focus, intensity profile and intensity and duration of the writing pulse. Optimization of these parameters is familiar to those skilled in the art.

As result of the controlled collapse in the microporous polymeric material, an information track comprising a succession of transparent voids results, with the voids appearing in those surface regions exposed to the high intensity beam due to the heating of the energy absorbing layer material in response to the high intensity beam exposure. Variations in the length and separation of the transparent voids are representative of the recorded information. Where a continuous sequence of pictures is to be recorded, a spiral information track may be formed by providing relative motion, in a radial direction and at a constant rate during the recording, between the recording beam and the rotating disk. Alternatively, in the absence of such spiral relative motion during the recording, a circular information track may be formed appropriate for "slide" or freeze frame recording purpose.

The result of the above-described recording process is the formation of an information record of a form which facilitates recovery of the recorded information by optical playback processes. The information track of such an information record comprises (1) undisturbed opaque surface regions alternating with (2) transparent regions formed by the recording process, due to complete, or at least partial, collapse of the microporous polymer layer. This information track can be, for example, in either analog or digital form.

While a recording medium in disk form has been used for illustration, the application of the recording medium to tapes and cards can be easily realized following the same principles outlined above. The recordation of the information would simply be achieved in a linear fashion, not a rotational fashion as described above.

In playback or read operations pursuant to the principles of the present invention, a light beam is focused upon the information track, e.g., of a rotating information record of the above-described type. The playback beam has a constant intensity at a level insufficient to effect collapse of the microporous polymer layer. A photodetector, positioned to receive light reflected from the successive regions of the information track as they pass through the path of the focused light, develops a signal representative of the recorded information. Alternatively, a signal based upon light transmission through the disk can be used to read the information. In the latter mode, if a substrate is used, it is necessary for the substrate to be transparent. The transmission mode of reading would be most applicable to a tape or card since the laser and detector are generally stationary.

The following examples are provided in order to further illustrate the present invention and the advantages thereof. The examples are in no way meant to be limitative, but merely illustrative.

EXAMPLE

Three samples of microporous film were prepared. The three samples were
(i) Celgard ®2400 (25μm thick)—as is;
(ii) Celgard ®2400—coated with a cellulose acetate resin containing a surfactant, the coating being about 1 μm thick; and,
(iii) Celgard ®2400—coated with a cellulose acetate resin, which film is washed with methanol to remove the surfactant, the film then being dried in a vacuum oven at room temperature for 1 hour.

All three samples were sputter coated with PdAu to a thickness of about 300 Angstroms. Laser irradiation times with a 10 mW argon laser were the same for all samples, i.e., three markings for each of the following irradiation times: 1 second, ½ second, ¼ second, ⅛ second, and 1/15 second. Both writing and reading was done at a power setting of 10 mW. In the writing portion no beam splitter was used. However, in the reading format a pellicle (40:40) beam splitter was used, hereby the power of the incident beam during reading was about 40% of that during the writing. All the recording conditions were kept constant during reading.

Using the machine direction of the Celgard ® film as a guide, all samples were run twice. One time with the machine direction, i.e., horizontal in the sample holder, and a second time with the machine direction, e.g, vertical in the holder.

The C (signal contrast) and S/N (signal-to-noise ratio) were for each of the samples. The C is defined as the ratio $R_b - R_a / R_b + R_a$, where $R_b$ is the reflectance before marking and Ra is the reflectance after marking. The S/N ratio is the ratio of S, which equals $R_b - R_a$, and N, which is the average deviation from the signal in the unmarked areas. Measurement of signals occurred both before and after marking of the samples. The results were as follows:

| Irradiation time | C | S/N |
|---|---|---|
| Celgard ® 2400, with machine direction: | | |
| 1 sec. | 0.20 | 2.9 |
| ½ sec. | 0.22 | 2.8 |
| ¼ sec. | 0.23 | 8.8 |
| ⅛ sec. | 0.25 | 5.8 |
| 1/15 sec. | 0.21 | 2.5 |
| Av. all times | 0.22 | 4.6 |
| Celgard ® 2400, across machine direction: | | |
| 1 sec. | 0.13 | 1.6 |
| ½ sec. | 0.14 | 2.7 |
| ¼ sec. | 0.12 | 1.8 |
| ⅛ sec. | 0.11 | 3.3 |
| 1/15 sec. | 0.07 | 3.1 |
| Av. all times | 0.11 | 2.5 |
| Coated Celgard ® 2400, with machine direction: | | |
| 1 sec. | 0.11 | 3.0 |
| ½ sec. | 0.10 | 3.0 |
| ¼ sec. | 0.10 | 3.2 |
| ⅛ sec. | 0.08 | 1.7 |
| 1/15 sec. | 0.07 | 1.7 |
| Av. all times | 0.09 | 2.5 |
| Coated Celgard ® 2400, across machine direction: | | |
| 1 sec. | 0.34 | 19.2 |
| ½ sec. | 0.09 | 8.6 |
| ¼ sec. | 0.18 | 27.7 |
| ⅛ sec. | 0.26 | 36* |
| 1/15 sec. | 0.33 | 45 |
| Av. all times | 0.24 | 27 |
| Coated Celgard ® 2400, across machine direction | | |
| 1 sec. | 0.33 | 37 |
| ½ sec. | 0.27 | 32 |
| ¼ sec. | 0.29 | 34 |
| ⅛ sec. | 0.20 | 24 |
| 1/15 sec. | 0.12 | 16 |
| Av. all times | 0.24 | 28 |
| Coated Celgard ® 2400, MeOH washed, with machine direction: | | |
| 1 sec. | 0.21 | 7.7 |
| ½ sec. | 0.22 | 16.2 |
| ¼ sec. | 0.15 | 4.2 |
| ⅛ sec. | 0.21 | 4.5 |
| 1/15 sec. | 0.22 | 7.0 |
| Av. all times | 0.20 | 7.9 |
| Coated Celgard ® 2400, MeOH washed, across machine direction | | |
| 1 sec | 0.24 | 25 |
| ½ sec | 0.24 | 25 |
| ¼ sec | 0.12 | 13 |
| ⅛ sec | 0.05 | 6 |
| 1/15 sec | 0.03 | 4 |
| Avg. all times | 0.14 | 14 |

*(Noise level too low to measure accurately)

Thus, it can be clearly seen from the foregoing that the S/N is enhanced with the polymer coating. Particularly enhanced results were obtained when the reading was done across the "machine direction", i.e., across the direction of stretching utilized in the preparation of the microporous Celgard ® film.

Although the invention has been described with preferred embodiments, it is to be understood that the variations and modifications may be resorted to as will be apparent to those skilled in the art. Such variations and modifications are to be considered within the purview and the scope of the claims appended hereto.

What is claimed is:
1. An optical recording medium for the recording of information comprising:
(i) an opaque microporous polymer layer coated with a polymeric layer, the pores of the microporous polymer having an effective pore size less than 500 Angstroms, and wherein the microporous layer collapses upon transmission of heat thereto, and
(ii) an energy-absorbing material situated with regard to the microporous polymer so as to be able to transmit heat thereto, and which upon irradiation with a light source transmits thermal energy to the microporous polymer layer to cause a collapse in the microporous structure of said microporous polymer layer in those areas irradiated.
2. The medium of claim 1, wherein the smooth polymeric layer coating comprises a cellulose acetate, polyester, epoxy, polyurethane or alkyd resin.
3. The medium of claim 1, wherein the microporous polymer layer comprises polypropylene or polyethylene.
4. The medium of claim 1, wherein the energy absorbing layer comprises a light absorbing layer deposited on one side of said microporous polymer layer.
5. The medium of claim 4, wherein the light absorbing layer is deposited on the side which is to face the light source.
6. The medium of claim 4, wherein the light absorbing layer comprises a metal.
7. The medium of claim 6, wherein the metal is nickel, aluminum, copper, chromium or palladium/gold.

8. The medium of claim 4, wherein the light absorbing layer comprises a polymer/dye system.

9. The medium of claim 8, wherein the polymer/dye system fulfills the dual role of polymeric coating for the microporous polymer layer and energy-absorbing material.

10. The optical recording medium of claim 1, wherein the medium is in the form of an optical disk or a tape.

11. The optical recording medium of claim 1, wherein the medium is in the form of a strip utilized on a card.

12. The optical recording medium of claim 1, wherein the medium further comprises a thermally stable substrate.

13. The optical recording medium of claim 1, wherein the medium is tensioned within a rigid frame.

14. The medium of claim 1, wherein the energy absorbing material comprises a dye material incorporated into the microporous polymer.

15. The recording medium of claim 1, wherein the microporous polymer layer is of a film made by a stretching technique and is oriented so that all reading and writing of information is accomplished across the direction of stretching.

16. An information medium, useful with playback apparatus employing a playback beam of light of a predetermined frequency, said medium comprising an opaque microporous polymer coated with a polymeric layer, the pores of the microporous polymer having an effective pore size less than 500 Angstroms, and a light absorbing layer deposited on one side of said microporous polymer layer, with an information track comprising a succession of transparent regions formed in said microporous polymer layer.

17. The medium of claim 16, wherein the microporous layer comprises polypropylene or polyethylene.

18. The medium of claim 16, wherein the light absorbing layer comprises a metal.

19. The medium of claim 18, wherein the metal is nickel, aluminum, copper, chromium or palladium/gold.

20. The medium of claim 16, wherein the light absorbing layer comprises a polymer/dye system.

21. The medium of claim 16, wherein the medium is in the form of a disk or a tape.

22. The medium of claim 16, wherein the medium is in the form of a strip utilized on a card.

23. The medium of claim 16, wherein the microporous polymer layer is of a film made by a stretching technique and is oriented so that reading of the information is accomplished across the direction of stretching.

24. A method of recording information in a thin film by irradiating the film with a laser beam in accordance with said information to form an information track in the film, the improvement which comprises said film being comprised of:
(i) an opaque microporous polymer layer coated with a polymeric layer, the pores of the microporous polymer having an effective more size less than 500 Angstroms, and
(ii) an energy absorbing layer deposited on one side of said microporous polymer layer, which upon irradiation heats up sufficiently to cause a collapse in the microporous structure of the polymer layer in those areas irradiated to thereby form an information track in the polymer layer of transparent regions.

25. The method of claim 24, wherein the film was made by a stretching technique and the irradiation is accomplished such that the information track in the film is across the direction of the stretching so that any subsequent reading of the information is accomplished across the direction of the stretching.

* * * * *